United States Patent
Scheid et al.

(10) Patent No.: US 12,062,807 B2
(45) Date of Patent: Aug. 13, 2024

(54) BATTERY HOUSING WITH SPARK TRAP

(71) Applicant: WEBASTO SE, Stockdorf (DE)

(72) Inventors: Dirk Scheid, Stockdorf (DE); Mario Meyer, Stockdorf (DE); Jochen Haussmann, Stockdorf (DE)

(73) Assignee: WEBASTO SE, Stockdorf (DE)

(*) Notice: Subject to any disclaimer, the term of this patent is extended or adjusted under 35 U.S.C. 154(b) by 631 days.

(21) Appl. No.: 17/281,784

(22) PCT Filed: Oct. 15, 2019

(86) PCT No.: PCT/EP2019/077913
§ 371 (c)(1),
(2) Date: Mar. 31, 2021

(87) PCT Pub. No.: WO2020/078972
PCT Pub. Date: Apr. 23, 2020

(65) Prior Publication Data
US 2021/0384584 A1 Dec. 9, 2021

(30) Foreign Application Priority Data
Oct. 15, 2018 (DE) .................. 10 2018 125 446.6

(51) Int. Cl.
*H01M 50/342* (2021.01)
*B60K 1/04* (2019.01)
(Continued)

(52) U.S. Cl.
CPC ........... *H01M 50/3425* (2021.01); *B60K 1/04* (2013.01); *H01M 50/213* (2021.01);
(Continued)

(58) Field of Classification Search
CPC ........... H01M 50/3425; H01M 50/249; H01M 50/367; B60K 1/04
(Continued)

(56) References Cited

U.S. PATENT DOCUMENTS 1,587,147 A * 6/1926 Clark .................... H01M 50/30
429/71
2008/0318121 A1 12/2008 Takagi
(Continued)

FOREIGN PATENT DOCUMENTS

| CN | 1985382 A | 6/2007 |
| CN | 101330160 A | 12/2008 |

(Continued)

OTHER PUBLICATIONS

International Search Report and Written Opinion for International Patent Application No. PCT/EP2019/077913 mailed Jan. 17, 2020, 11 pages.

(Continued)

*Primary Examiner* — Pamela H Weiss
*Assistant Examiner* — John S Medley
(74) *Attorney, Agent, or Firm* — Haynes and Boone, LLP (57) ABSTRACT

A battery housing for accommodating one or more battery modules in its housing interior to form a traction battery for a motor vehicle, includes a housing section for partially delimiting the housing interior, the housing section having an exhaust duct integrated therein for discharging media which emerge from a battery module in the event of a defect thereof to the surroundings, and the exhaust duct having an inlet region through which the media enter the exhaust duct from the housing interior, and a first deflection region which is designed and configured to change the transport direction of the media.

15 Claims, 5 Drawing Sheets

(51) Int. Cl.
*H01M 50/213* (2021.01)
*H01M 50/224* (2021.01)
*H01M 50/24* (2021.01)
*H01M 50/249* (2021.01)
*H01M 50/367* (2021.01)

(52) U.S. Cl.
CPC ......... *H01M 50/224* (2021.01); *H01M 50/24* (2021.01); *H01M 50/249* (2021.01); *H01M 50/367* (2021.01); *H01M 2220/20* (2013.01)

(58) Field of Classification Search
USPC .......................................................... 429/54
See application file for complete search history.

(56) References Cited

U.S. PATENT DOCUMENTS

| | | | |
|---|---|---|---|
| 2012/0129024 A1 | 5/2012 | Marchio et al. | |
| 2015/0143815 A1* | 5/2015 | Salunkhe | F01D 25/30 415/108 |
| 2016/0166971 A1* | 6/2016 | Fukuhara | B01D 53/0407 96/108 |
| 2016/0308182 A1 | 10/2016 | Kim | |
| 2018/0013110 A1* | 1/2018 | Wuensche | B60L 50/64 |
| 2020/0058973 A1* | 2/2020 | Golubkov | H01M 50/30 |
| 2020/0303702 A1* | 9/2020 | Nakamura | H01M 50/30 |

FOREIGN PATENT DOCUMENTS

| | | | | |
|---|---|---|---|---|
| CN | 102473884 A | 5/2012 | | |
| CN | 102656718 A | 9/2012 | | |
| CN | 102714289 A | 10/2012 | | |
| CN | 102782931 A | 11/2012 | | |
| CN | 105280861 A | 1/2016 | | |
| CN | 106605315 A | 4/2017 | | |
| DE | 102011087198 A1 | 5/2013 | | |
| DE | 102012102657 A1 * | 10/2013 | ......... | H01M 10/625 |
| DE | 10 2013 204 087 A1 | 9/2014 | | |
| DE | 10 2014 207 403 A1 | 10/2015 | | |
| DE | 10 2014 212 173 A1 | 1/2016 | | |
| DE | 10 2014 213 916 A1 | 1/2016 | | |
| DE | 10 2014 012 568 A1 | 3/2016 | | |

OTHER PUBLICATIONS

Office Action for Chinese Patent Application No. 201980067778.5 dtd Oct. 16, 2023; 9 pages.

* cited by examiner

BATTERY HOUSING WITH SPARK TRAP

CROSS REFERENCE TO RELATED APPLICATIONS

This application is a national stage of International Application No. PCT/EP2019/077913 filed Oct. 15, 2019, which claims priority from German Patent Application 10 2018 125 446.6 filed Oct. 15, 2018 in the German Patent and Trademark Office, the disclosures of which are incorporated herein by reference in their entirety.

BACKGROUND

Technical Area

The present invention relates to a battery housing for a motor vehicle, which is adapted to accommodate a battery module in its housing interior to form a traction battery for the motor vehicle.

Related Art

Battery systems for electric and hybrid vehicles as well as fuel cell vehicles are the subject matter of current research and development. The performance-related parameters of a battery system, such as service life and capacity, depend significantly on the application environment. Both during the provision and delivery of electrical power and during charging, the electrochemical processes taking place in the battery depend on the ambient temperature, for example.

For reliable operation of a battery system it is therefore important to create and maintain well-defined surroundings. In addition, the individual battery modules must be protected and wired. For these and other reasons, a battery housing is provided that is configured to accommodate battery modules and protect them from external factors.

At the same time, the battery housing serves as a safety device in the event of a defect, such as a thermal runaway, which can lead to the explosive escape of media such as hot gases, combustion products and battery cell components from a battery cell. The aim is to ensure controlled transport of these media out of the battery housing in order to minimize damage to the battery system and the vehicle. Thermal runaway, also known as "thermal propagation", is an exothermic reaction in a cell caused by internal or external faults that result in sudden destruction of the cell.

DE 10 2014 207 403 A1 describes a battery unit with several electrochemical cells and a degassing collector. The degassing collector has a degassing duct and a cooling duct. The degassing collector further comprises openings through which a fluid escaping from the electrochemical cells and passing through a safety valve can enter the degassing duct and be discharged. A similar venting system is described in US 2012/0129024 A1.

Current battery modules degas mainly diffusely and unguided into the battery housing. Pressure release from the housing into the surroundings is accomplished by means of an emergency ventilation system, also referred to as a "venting system." This depressurization, referred to as "blowing off" a cell, can be accompanied by the emission of flames, high volumes of gas over several seconds, and cell material. The media emitted in the event of a thermal runaway are of such high energy content, comparable to a welding torch, that substantial damage to the battery system and vehicle is possible even with a venting system installed. In particular, equipment in the battery system that is relevant for control can be affected.

The escape of flames and gases in the event of a defect is currently hardly monitored, and destruction or contamination of the entire battery pack is tolerated. Sparks can also escape uncontrolled from the battery cell or battery module, which promotes flame formation when an ignitable mixture is reached. In particular, uncontrolled mixing of potentially ignitable gas with oxygen from the ambient air leads to ignition when sparks are emitted and can result in a fire of the module, increasing the risk of complete destruction of the battery system and damage to the vehicle body. Potential solutions require additional space within the battery system. Notwithstanding the above-mentioned safety problems in the event of a defect, the battery modules are designed to absorb swelling forces (arising from charging/discharging and aging), which are absorbed by suitably stable housing sections, in particular housing end plates. The housing sections for absorbing such forces are designed with a certain degree of flexibility so that they can change shape.

SUMMARY

Accordingly, a battery housing for accommodating one or more battery modules in its housing interior for forming a traction battery for a motor vehicle is proposed, which includes a housing section for partially delimiting the housing interior. According to the various embodiments, the housing section has an exhaust duct integrated therein for discharging to the surroundings media exiting from a battery module in the event of a defect therein. The exhaust duct has an inlet region through which the media from the housing interior enter the exhaust duct, and a first deflection region which is designed and configured to change the transport direction of the media.

The battery housing can be made of plastic, metal, another material or a combination of different materials and serves to protect the battery modules accommodated in the housing interior from external factors. The battery housing is generally designed for use in an electric or hybrid vehicle or fuel cell vehicle.

In this context, the term "media" mainly refers to hot gases, combustion products and battery cell components that can be created and/or released, for example, during thermal runaway of a battery cell of the battery module. For example, in the event of thermal runaway, hot gases escape quasi-explosively from the affected battery cell. The hot gas stream can thus also contain liquids and solids, such as particles or fragments caused by the explosion. The terms "media" and "exhaust gas" are used synonymously. The media released during thermal runaway are directed through the exhaust duct in a defined manner, which also makes the above designation "transport direction" or "direction of movement" well-defined.

By integrating the exhaust duct into the housing section, controlled exhaust gas discharge can be ensured in the event of a defect, irrespective of the battery module concerned and its position in the housing interior. The transport path in the housing interior is minimized, since a large part of the exhaust path takes place in the exhaust duct integrated in the housing section, i.e. within the housing wall.

This increases the functional safety of the battery housing, as possible pressure losses and/or accumulations are minimized and the exhaust gas routing bypasses functionally necessary equipment and safety components in the interior of the housing, thus protecting them. In addition, the energydense media escaping from the battery module can be directed away from other battery modules in a controlled manner, thus preventing or at least slowing down any ignition of neighboring battery modules.

Furthermore, the exhaust duct can be integrated in the housing section easily, saving packaging space and at low cost. The integration of the exhaust duct into the housing section also offers additional safety, as the exhaust duct is specially protected so that it can hardly be damaged, for example, by a battery cell of a battery module rupturing. It should be noted that the above technical effects and advantages are equally realized in the case of several integrated exhaust ducts.

Further safety aspects are realized by deflecting the exhaust gas flow. On the one hand, this slows down any carried particles, and on the other hand sparks that could ignite the exhaust gas are prevented from leaving the battery housing. The sparks strike the inner wall of the hollow profile of the exhaust duct, are stopped and thus remain in an area where ignition of the exhaust gas is prevented or at least made more difficult due to a lack of oxygen. In other words, in the case of thermal runaway, the released potentially flammable media are prevented from being exposed to the flame-generating factor "spark" before ignition capability occurs by contact with oxygen. In this way, the probability of flame formation is significantly reduced. By intercepting any sparks within the exhaust duct, the ignition factor can also be prevented from spreading to other areas within the battery system.

In some embodiments, the first deflection region is designed and configured to deflect the transport direction of the media by at least 45°, for example about 90°, which is particularly effective in reducing the flammability of the battery system in the event of a thermal runaway.

In certain embodiments, the exhaust duct has a parallel region which adjoins the first deflection region in the transport direction of the media and which runs inside the housing section parallel to the main plane thereof. The term "main plane" is well defined by the usual plate-like shape of a housing section. By guiding the exhaust gas in the housing section parallel thereto, the guided distance can be controlled, in particular extended, thereby further reducing the velocity of the exhaust gas flow and further reducing the probability of flame formation.

In several embodiments, the exhaust duct has a second deflection region which adjoins the parallel region in the transport direction of the media and is designed and configured to change the transport direction of the media a further time by deflecting, typically by at least 45°, for example about 90°. This allows a further reduction of the fire risk of the battery system.

In various embodiments, the exhaust duct further includes an outlet region through which the media leave the housing section and which forms a T-shape with the parallel region at the second deflection region, such that one section of the parallel region forms a connection between the inlet region and the outlet region and the other section ends inside the housing section, whereby the latter forms a collection device. The collection device defines a kind of chamber in which particles of the media released during thermal runaway, which have already been slowed down by the first deflection in the first deflection region, can get trapped. These are thus not transported to the outside with the volume flow by the collection device. In addition, sparks can get trapped in the collection device that have not already been eliminated or have been newly formed within the exhaust gas routing. This technical measure also separates the ignition factor "spark" from the ignitable exhaust gas mixture. The fire risk of the battery system can be significantly reduced in this way.

In some embodiments, the exhaust duct has a hollow chamber profile which is at least partially reinforced by one or more struts. The strutting allows the housing section with integrated exhaust duct to be reinforced, whereby forces can be selectively diverted and distributed. By combining the exhaust duct with the force-absorbing housing section, in particular using such a strutting, the described safety aspects can be realized in a space- and cost-optimized manner. The nature of the strutting, i.e. the number of struts, positions, layers, thicknesses, etc., depend on the overall design of the battery system and the application environment and can be calculated and optimized depending on the behavior of the battery system.

In several embodiments, the interior of the housing is sealed off from the surroundings during regular operation in such a way that there is essentially no exchange of gas and/or liquid with the surroundings, with forced ventilation generally being provided by means of which pressure equalization between the interior of the housing and the surroundings can be effected.

The housing serves to protect the battery modules and equipment, such as control equipment and wiring, housed therein from external factors and to create and maintain an atmosphere favorable for the operation of the battery modules. For this reason, in the normal state, the housing typically seals the interior space completely, for example hermetically. Pressure equalization can only be provided by the forced venting. The forced venting is generally designed in such a way that only a gas exchange with a low volume flow is possible, so that an entry of contamination or water into the interior of the housing is not to be concerned.

To further reduce flammability, the housing interior typically has a low-oxygen atmosphere. This can be achieved by at least partially filling the interior of the housing with a foam material of low flammability.

In some embodiments, the exhaust duct has an inner opening at the inlet region via which the exhaust duct is in communication with the housing interior. A battery module is generally accommodated in the housing interior, which has a module-internal exhaust duct that is in communication with the inner opening, the module-internal exhaust duct preferably being directly connected to the inner opening. Thus, in the event of thermal runaway of a battery cell, the media escaping from the battery cell can be discharged from the interior of the battery housing into the surroundings via the exhaust duct in a particularly controlled manner. Diffuse and uncontrolled degassing in the interior of the housing is prevented. In this way, the sealing and safety functions of the battery housing can also be implemented reliably and in a structurally simple and compact manner. By directly connecting the module's internal exhaust gas path to the inner opening, the exhaust gas path in the housing interior can be further shortened. The media thus enter the exhaust duct integrated in the housing section as quickly as possible and in a controlled manner. This further increases the functional safety of the battery housing, as possible pressure losses and/or blockages are minimized and the exhaust gas routing optimally bypasses functionally necessary equipment and safety components in the interior of the housing, thus protecting them.

In an exemplary embodiment, the housing interior accommodates a plurality of battery modules, each with at least one module-internal exhaust duct, and in this case the integrated exhaust duct has a plurality of inner openings, each module-internal exhaust duct being in communication with a respective inner opening, and generally each module-internal exhaust duct being directly connected to the corresponding inner opening. Each battery module thus has at least one direct access to the exhaust duct, which means that in the event of a defect the exhaust gases can be discharged particularly quickly and directly into the outer surroundings without unnecessary detours via the housing interior. In order to connect several battery modules to an exhaust duct, the exhaust duct generally includes at least one parallel region which runs in the plane of the housing section, i.e. parallel to the outer and inner surfaces of the housing section.

In some embodiments, the exhaust duct communicates with the interior of the housing via a safety valve, the safety valve being designed and configured to close the exhaust duct during regular operation and to open the exhaust duct when media occur in the event of a defect in one battery module. The safety valve is typically provided in the exhaust duct, but can also be provided, for example, in a module-internal exhaust duct or as a separate component. In this way, the sealing and safety functions of the battery housing described above can be reliably implemented. In particular, by providing the safety valve, the battery housing can remain hermetically sealed during normal operation.

It should be noted that the features, technical effects and advantages described herein apply equally to the case of multiple exhaust ducts, battery modules, safety valves, etc., even though the singular is usually chosen for the sake of linguistic simplicity.

In some embodiments, the safety valve opens the exhaust duct when the value of a pressure difference between the interior of the housing and the outer surroundings exceeds a threshold value. In this case, the triggering of the safety valve is determined in a simple and reliable manner based on the pressure difference.

A particularly compact, operationally and assembly-safe design of the safety valve can be achieved by providing the safety valve at the inner opening and generally integrating it into the housing section.

In this case, the safety valve can have or can be formed as a rupture disc, which breaks in the event of opening. The safety behavior described above, which is determined by the pressure difference, can be realized in this way in a structurally particularly simple and at the same time reliable manner.

In various embodiments, the rupture disc is formed by a local thinning of the wall of the housing section in the area of the exhaust duct. Such a reduction in wall thickness can be produced in a simple manner, for example by milling. The residual wall thickness of the rupture disc is selected so that, in the event of thermal runaway of a battery cell, the hot media striking it respectively the pressure generated by them cause the rupture disc to break and thus open the way to the exhaust duct. By reducing the wall thickness of the rupture disc, the position and properties of the safety valve can also be flexibly adapted to changes in the geometry or equipment of the battery housing, while at the same time being safe to operate and assemble.

In certain embodiments, the housing section has an extrusion profile or is produced by extrusion. In this way, the exhaust duct can be integrated into the housing section in a simple manner in terms of design and production technology.

In several embodiments, the housing section forms part of the external shape or casing of the battery system. In other words, the housing section is generally not a device located within the interior of the housing, thereby optimizing the functional safety of the battery housing in the event of a defect. Thus, the housing section may form a bottom of the battery housing or a portion thereof. Alternatively or additionally, the housing portion may form an end plate of the battery housing, i.e., a short side of the housing in the case of a cuboid battery housing. In some embodiments, both end plates of a cuboid battery housing are provided with an integrated exhaust duct as described above.

In various embodiments, the housing section is formed integrally with the exhaust duct, with the exhaust duct generally being embedded in the housing section, whereby the exhaust duct is particularly protected and the functional safety of the battery housing is optimized in the event of a defect.

In certain embodiments, the battery module has a plurality of cylindrical battery cells that are mechanically held together. For this purpose, the battery module typically includes one or more cell holders in which the battery cells are at least partially accommodated, whereby the battery cells are held at predetermined positions and in predetermined positions. In the event of a defect in a battery cell leading to thermal runaway, the media is conducted via any module-internal exhaust duct to the integrated exhaust duct and discharged to the outside in a safe and controlled manner.

Further advantages and features of the present invention are apparent from the following description of exemplary embodiments. The features described therein may be implemented alone or in combination with one or more of the features set forth above, so far as the features do not conflict. In this regard, the following description of exemplary embodiments is made with reference to the accompanying drawings.

BRIEF DESCRIPTION OF THE FIGURES

Further embodiments of the invention are explained in more detail by the following description of the Figures.

FIGS. 5a to 5d show different views of a housing section with integrated exhaust duct according to a further embodiment, wherein FIG. 5b shows a top view of the housing section.

DETAILED DESCRIPTION

In the following, exemplary embodiments are described on the basis of the figures. In this context, identical, similar or similarly acting elements are provided with identical reference signs in the various figures, and a repeated description of these elements is partially omitted in order to avoid redundancies.

Figure 1:
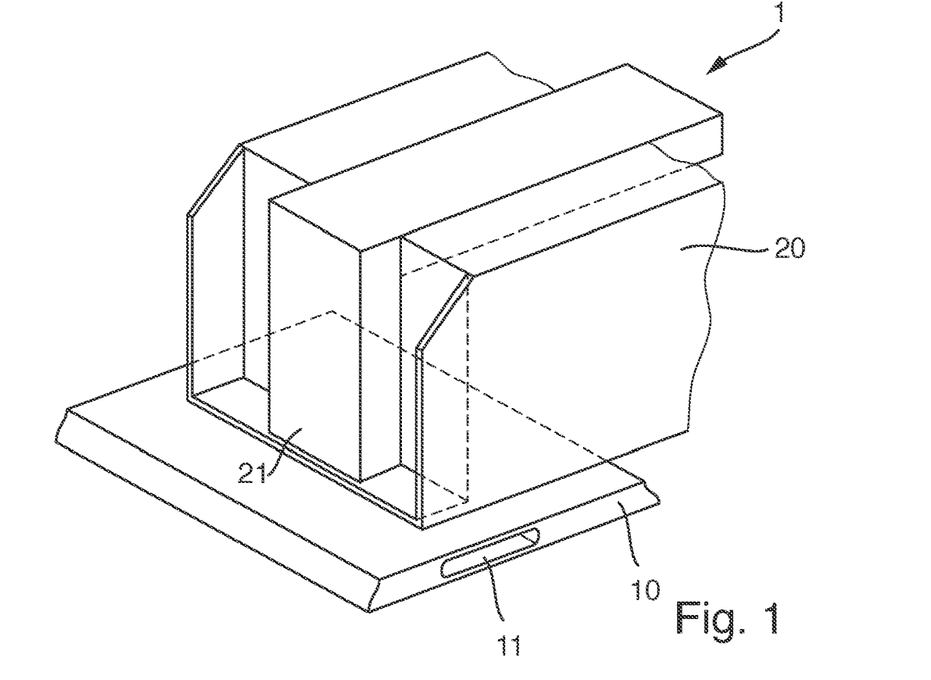
FIG. 1, shows, in a perspective and partially transparent manner, a section of a battery system having a housing section with an integrated exhaust duct and a battery module mounted thereon.

FIG. 1 shows in a perspective and partially transparent manner a section of a battery system including a battery housing 1.

The battery housing 1 has a housing section 10. The housing section 10 forms at least part of a housing wall of the battery housing 1. In other words, the housing wall forms the outer shape or casing of the battery housing 1, that is, the housing section 10 is not a device located inside the battery housing 1.

The housing wall delimits and defines the housing interior, in which battery modules and other devices, described in detail further below, are then finally accommodated, by means of which a battery system for forming a traction battery for a motor vehicle is formed.

An exhaust duct 11 is integrated in the housing section 10.

The housing section 10 is generally produced by extrusion, which allows the exhaust duct 11 to be easily integrated into the housing section 10 in terms of design and production technology. The housing section 10 thus typically has an extrusion profile. For example, the housing section 10 is made of a metal, for example aluminum. However, the battery housing 1, in particular the housing section 10, may also be manufactured by other means, for example by injection molding, and/or from another material.

The housing section 10, for example the housing bottom or an end plate of the battery housing 1, may be constructed from a plurality of extrusion profiles which are arranged side by side and subsequently joined together. The exhaust duct 11 described herein may then be provided in one or more of these extrusion profiles, in order to achieve a controlled discharge of media during a thermal runaway of a battery cell.

If several extrusion profiles are arranged next to each other to form the housing section 10—for example, the housing base or a side wall of the battery housing 1—several exhaust ducts 11 can also be provided next to each other and essentially parallel to each other.

Figure 2:
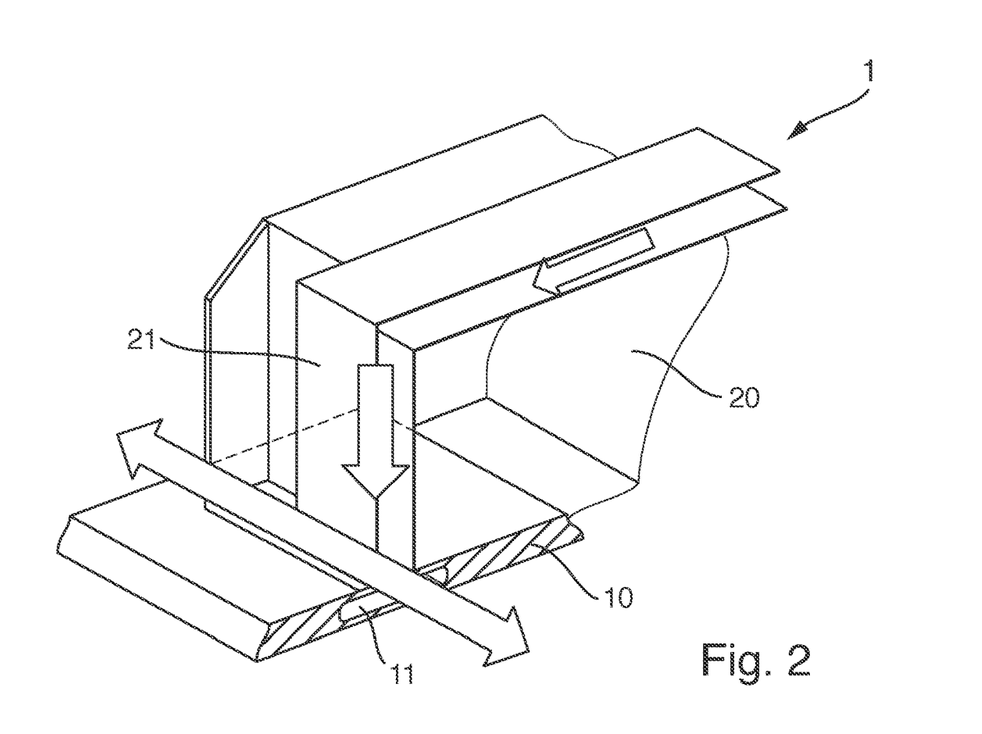
FIG. 2 shows the flow path taken by exhaust gases in the event of a defect in the battery system shown in FIG. 1.
Figure 3:
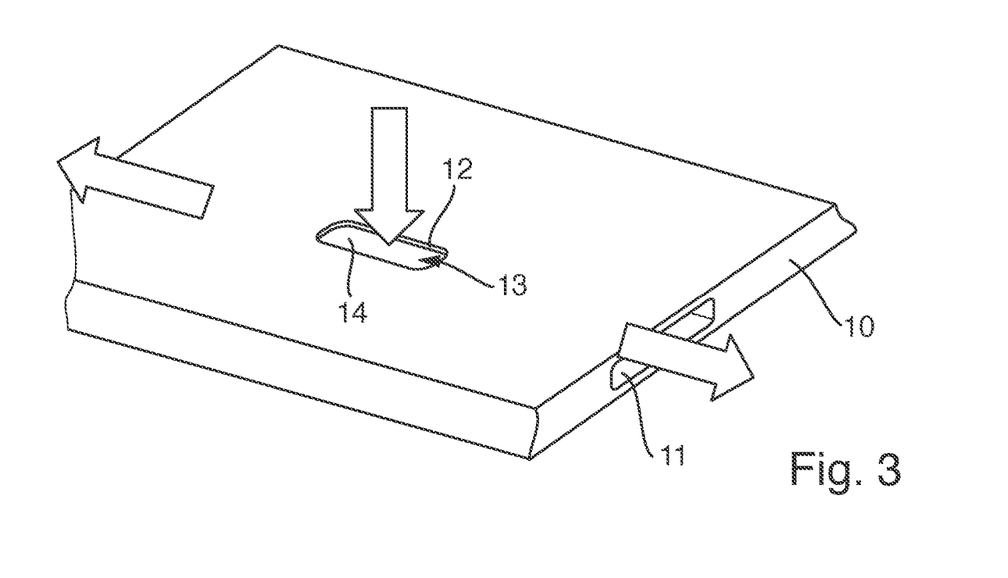
FIG. 3, shows, in perspective manner, a section of the housing section with integrated exhaust duct according to FIG. 1, but without the battery module, whereby the safety valve to the exhaust duct is visible.
Figure 4:
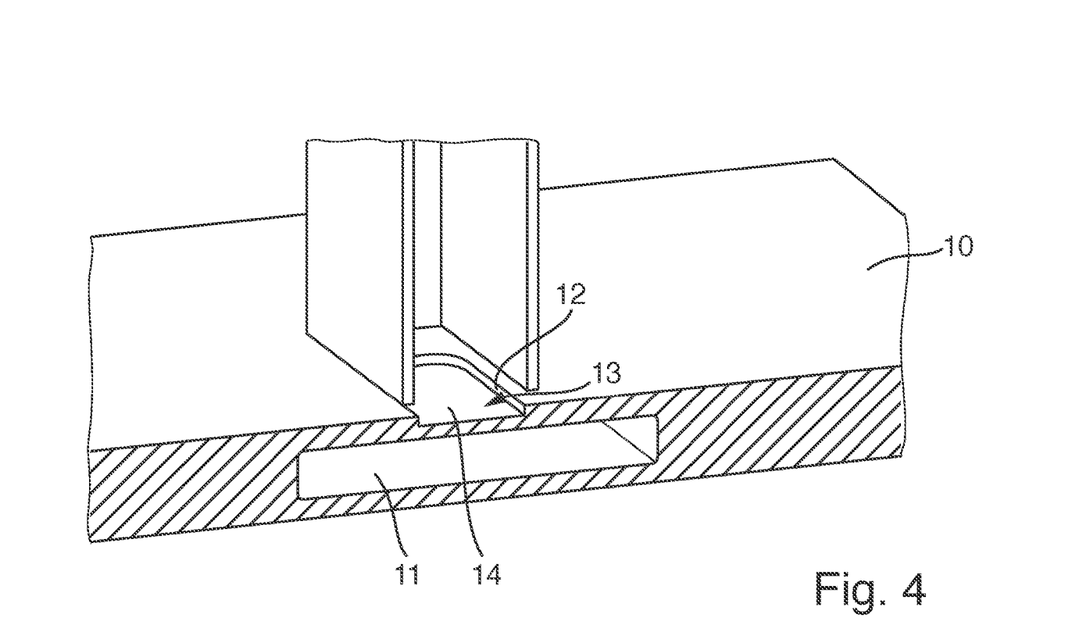
FIG. 4, shows, in a perspective and cutaway manner, the positioning and connection of the module-internal exhaust duct to the integrated exhaust duct.

The exhaust duct 11 has at least one inner opening 12, the position, shape and configuration of which can be seen in FIGS. 3 and 4. The inner opening 12 connects the exhaust duct 11 to the housing interior—more specifically, to a battery module 20 arranged in the housing interior, as described in detail below. The exhaust duct 11 further has one or more external openings (not shown in FIGS. 1 to 4), through which the media escaping in the event of a defect are discharged to the outside. In this way, in the event of an emergency, the interior of the housing communicates with the outer surroundings via the exhaust duct 11, so that the media can be largely discharged to the surroundings and do not remain in the interior of the battery housing 1.

In some embodiments, the exhaust duct 11 includes at least one section which lies in the plane of the housing section 10, i.e. parallel to the outer and inner surfaces of the housing section 10. In this way, several battery modules 20 can be connected to the exhaust duct 11. In addition, the housing section 10 with integrated or embedded exhaust duct 11 is particularly easy to finish as an extrusion profile in this way. Furthermore, the exhaust gas flow is diverted after it enters the exhaust duct 11 through the inner opening 12, thereby implementing various safety functions as described in detail below with reference to FIGS. 5a to 5d.

When the housing section 10 is manufactured by means of an extrusion profile, the exhaust duct 11 typically lies in the extrusion direction and therefore extends along the entire extrusion profile parallel to the surfaces which form the outer and inner surfaces of the battery housing 1, respectively the housing section 10.

The battery housing 1, and thus the interior of the housing, is substantially sealed from the surroundings for regular operation, so that the components accommodated in the battery housing 1, in particular the battery modules 20, are shielded from the surroundings and their influences.

In various embodiments, the battery housing 1 has a forced ventilation, by means of which a pressure equalization between the interior of the battery housing 1 and the surroundings can be achieved in order to avoid the build-up of overpressure or negative pressure in the battery housing 1. The forced ventilation has very small dimensions and cannot be used to discharge the media to the surroundings in the event of thermal runaway of a battery cell.

To ensure that the housing provides protection for the battery modules 20 and any other equipment from external factors during regular operation, a safety valve 13 is provided in the exhaust duct 11, typically in the area of the inner opening 12.

The safety valve 13 opens or is triggered if there is too high a pressure difference between the interior of the housing and the exhaust duct 11 connected to the outer surroundings. Thus, the safety valve 13 opens when the pressure difference exceeds a threshold value, for example approximately 1 bar.

The safety valve 13 is generally implemented by a so-called rupture disc 14, which breaks in the event of occurrence. According to a structurally simple and yet reliable embodiment example, the rupture disc 14 is produced by milling out or otherwise thinning the wall of the housing section 10 in the area of the exhaust duct 11.

The exhaust duct 11 is dimensioned to permit a volume flow which allows the media to be discharged in the event of an accident without causing an excessive increase in pressure inside the battery housing 1.

This is particularly clear from the cutaway view of FIG. 4. The residual wall thickness of the rupture disc 14 is selected in such a way that, in the event of thermal runaway, the hot gas striking it the rupture disc 14 breaks and thus opens the way to the exhaust duct 11.

The battery housing 1 further includes at least one, typically more, battery modules 20 located inside the battery housing 1. In FIGS. 1 and 2, a battery module 20 is shown partially transparent as an example to show the connection to the exhaust duct 11. The arrows in FIG. 2 schematically show the flow path of the media.

Typically, several cylindrical battery cells are combined to form a battery module 20. For this purpose, the battery module 20 has one or more cell holders in which the battery cells are at least partially received, whereby the battery cells are mechanically held together at predetermined positions and in predetermined layers. For the sake of clarity, the battery cells, the cell holders and their contacts are not shown in the Figures.

The battery module 20 has a module-internal exhaust duct 21 which, in the event of a defect in a battery cell, directs the media escaping from the battery cell to the exhaust duct 11. For this purpose, the module-internal exhaust duct 21 is in communication with the inner opening 12. The connection of the module-internal exhaust duct 21 to the exhaust duct 11 is particularly clear from FIG. 4.

The battery cells generally have predetermined breaking points, whereby the outlet location of the media is largely defined. The position and shape of the module-internal exhaust duct 21 can be defined accordingly, thus reducing or preventing uncontrolled, diffuse degassing.

It should be noted that although the safety valve 13 is typically part of the housing section 10 for manufacturing reasons, it can alternatively be provided in the module-internal exhaust duct 21.

In some embodiments, each battery module 20 is individually connected to an exhaust duct 11 via its own module-internal exhaust duct 21 and an associated safety valve 13, even if only one battery module 20 and one exhaust duct 11 are shown in the Figures for the sake of clarity.

By implementing the exhaust ducting as outlined above in the housing section 10, generally in the housing base or a side wall, by means of the exhaust duct 11, controlled exhaust gas discharge can be ensured in the event of a defect, irrespective of the battery module 20 concerned and its position in the housing.

The transport path for the media inside the battery housing 1 is minimized. This increases the functional safety of the battery housing 1, as the exhaust gas routing protects functionally necessary equipment and safety components in the interior of the housing and realizes short degassing paths. Possible pressure losses and/or accumulations are thus minimized, whereby the exhaust gas is discharged into the outer surroundings in a controlled manner.

In addition, the exhaust duct 11 or the multiple exhaust ducts 11 are easy to integrate in the housing, saving packaging space and reducing costs. Embedding the exhaust ducts 11 in the housing wall also provides additional safety, since the exhaust ducts 11 are protected and can hardly be damaged by a battery cell bursting inside a battery module 20.

For each battery module 20, there is generally at least one direct access to an exhaust duct 11, which means that in the event of a defect, the exhaust gases can be discharged particularly quickly into the outer surroundings without detours via the interior of the housing.

The safety valve 13 or the multiple safety valves 13 are implemented approximately as a rupture disc 14, typically as a milled-out or thinned-out section of the wall in the area of the exhaust duct 11. This allows the safety valves 13 to be adapted in a simple and flexible manner to modified geometries or equipment of the battery housing 1.

Exemplary designs of the exhaust duct 11 in the housing section 10 are described in more detail below.

Figure 5A:
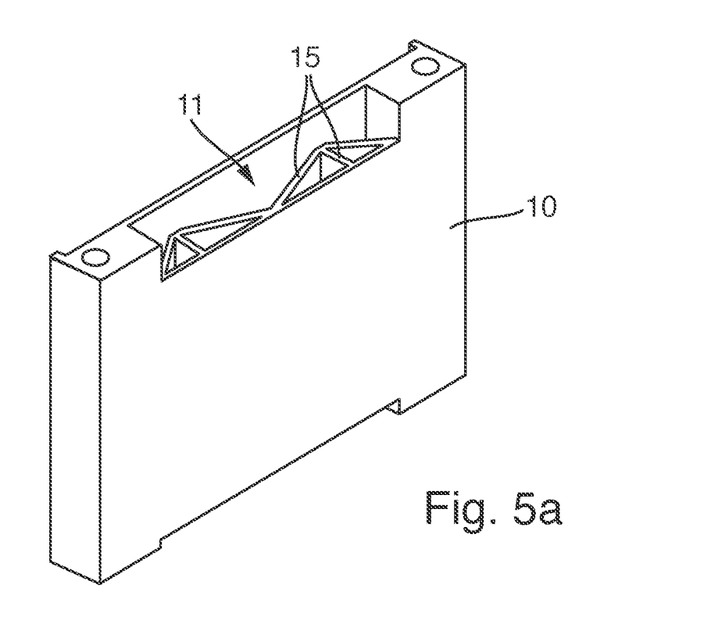
FIG. 5a shows the housing section in perspective.
Figure 5B:
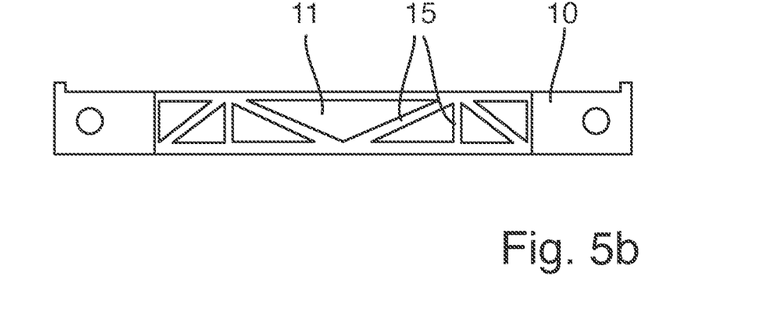
Figure 5C:
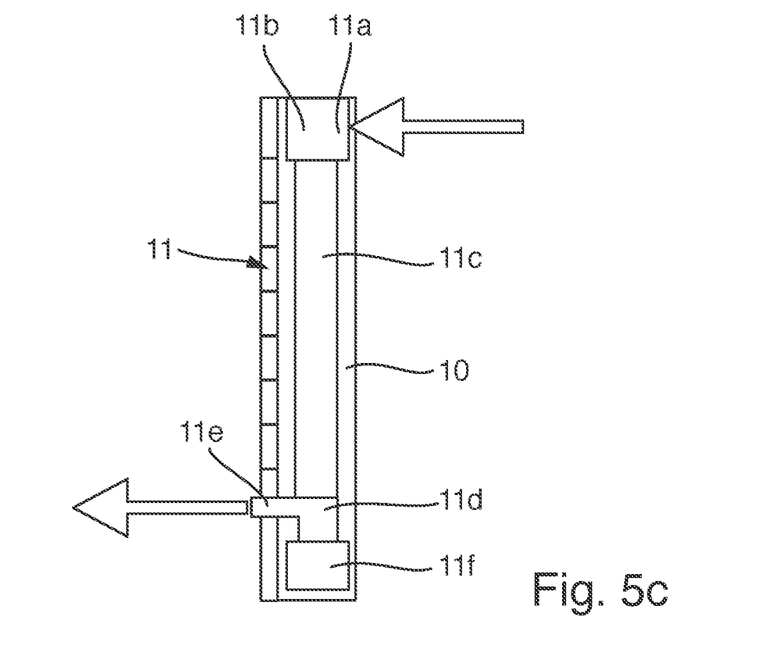
FIG. 5c shows a half section with illustration of the exhaust duct routing in the exhaust duct.
Figure 5D:
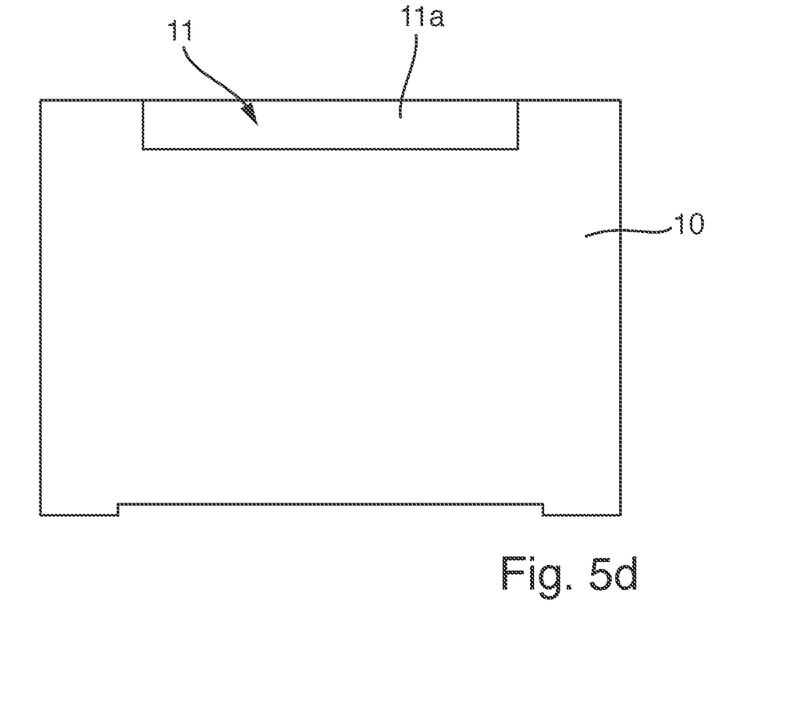
FIG. 5d shows a view from the direction of the module-internal exhaust duct onto the housing section.

In this regard, FIGS. 5a to 5d show various views of the housing section 10 with integrated exhaust duct 11 according to a further embodiment. FIG. 5a shows the housing section 10 in a perspective manner. FIG. 5b is a top view of the housing section 10 in the direction of the main extension of the exhaust duct 11. FIG. 5c shows a half-section illustrating the exhaust duct 11, and FIG. 5d is a view of the housing section 10 from the direction of the module-internal exhaust duct 21. For clarity reasons, the safety valve 13 is not shown in FIGS. 5a to 5d.

The exhaust duct 11 according to the embodiment of FIGS. 5a to 5d has a hollow chamber profile reinforced by struts 15, as shown in FIGS. 5a and 5b. The strutting allows the housing section 10 with integrated exhaust duct 11 to be reinforced, whereby mechanical forces can be selectively diverted and distributed. The nature of the strutting, i.e., the number of struts 15, positions, layers, thicknesses, etc., depend on the overall design of the battery system and the application environment, and can be calculated and optimized depending on the behavior of the battery system. Ultimately, however, the function of force absorption and transmission is implemented, including between housing sections 10, such as from end plate to end plate. Furthermore, the struts 15 are generally designed such that the hollow chamber profile of the exhaust duct 11 can still be finished as an extrusion profile, typically made of metal such as aluminum.

In the event of thermal runaway, the released media, in particular hot gases, are directed through the module-internal exhaust ducts 21 to one of the housing sections 10 with integrated exhaust duct 11. The exhaust gas thus already guided inside the battery housing 1 enters the exhaust duct 11 and is thereby changed in direction so that it is subjected to a deflection, for example of at least 45°. According to the embodiments set forth herein, a deflection of about 90° is realized, as is particularly clear from FIGS. 2 and 5c, in which the exhaust gas routing is shown by arrows.

In other words, the exhaust duct 11 of the housing section 10 has an inlet region 11a, a deflection region 11b, hereinafter referred to as the "first deflection region", and a parallel region 11c, as shown in FIG. 5c. The exhaust gas enters the exhaust duct 11 of the housing section 10 through the inlet region 11a, is deflected parallel to the main plane of the housing section 10 in the first deflection region 11b, and is then directed parallel thereto in the parallel region 11c.

By deflecting the exhaust gas flow in the housing section 10, any sparks that could ignite the hot gas are prevented from leaving the battery housing 1. The sparks strike the inner wall of the hollow profile of the exhaust duct 11, are stopped and thus remain in an area where ignition of the exhaust gas is prevented or at least made more difficult due to the lack of oxygen. In other words, in the case of thermal runaway, the released potentially flammable media are prevented from being exposed to the flame-generating factor "spark" before reaching ignition capability by contact with oxygen. In this way, the probability of flame formation is significantly reduced.

By intercepting any sparks within the exhaust duct 11, the ignition factor can also be prevented from spreading to other areas within the battery system.

The fire risk of the battery system can be further reduced if, after being directed in the parallel region 11c along the main plane of the housing section 10, the exhaust gas flow is deflected a further time in a second deflection region 11d, for example by at least 45°, before the media leave the housing section 10 through an outlet region 11e, see FIG. 5c. In the example of FIG. 5c, the exhaust gas flow is again deflected by about 90°.

According to an embodiment, the outlet region 11e is not located at the end of the parallel region 11c but the outlet region 11e and the parallel region 11c generally form a T-shape. While one section of the parallel region 11c forms a connection between the inlet region 11a and the outlet region 11e, the other section ends inside the housing section 10, thereby forming a collection device 11f. Particles of the media released during a thermal runaway, which have already been slowed down by the first deflection in the first deflection region 11b, can get trapped in the collection device 11f. These are thus not brought to the outside with the volume flow by the collection device 11f. In addition, sparks can get trapped in the collection device 11f that have not already been removed or have been newly formed inside the exhaust duct 11. This technical measure also separates the ignition-giving factor "spark" from the ignitable exhaust gas mixture. The fire risk of the battery system can be further reduced in this way.

The combination with the load-bearing housing section 10, in particular using the strutting described above, allows the safety aspects described to be realized in a space- and cost-optimized manner.

Figure 6:
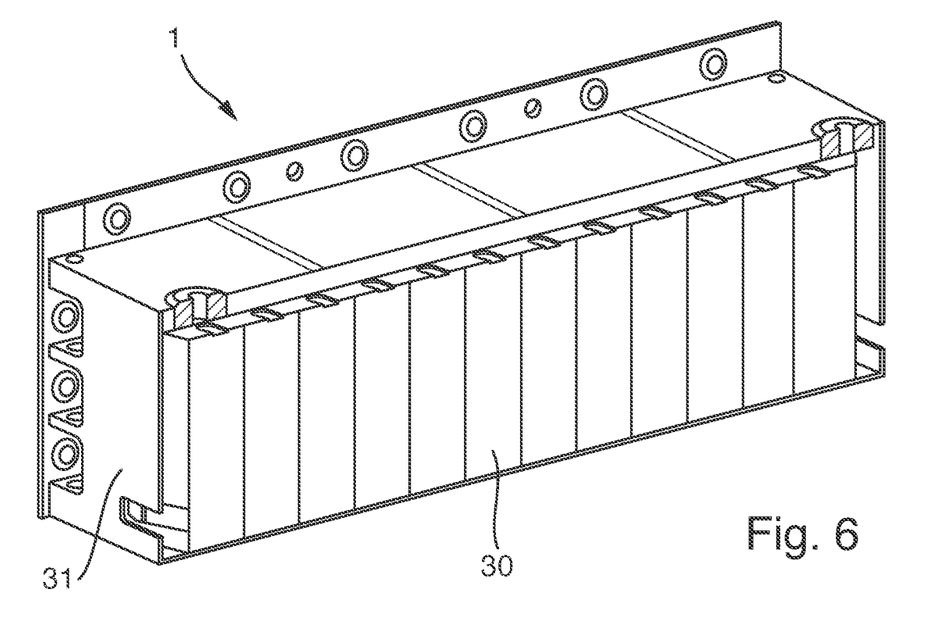
FIG. 6 is a perspective view of a battery housing showing a bottom side and end plate thereof.

FIG. 6 shows in perspective a battery housing 1 with a view of a bottom side 30 and an end plate 31. The battery housing 1 is cuboidal in shape. The end plates 31, i.e. the short sides, are typically each formed by a housing section 10 with an integrated exhaust duct 11 in accordance with one of the embodiments set out above. It should be noted that the outlet openings of the outlet regions 11*e* are not shown in FIG. 6.

To the extent applicable, all of the individual features shown in the embodiments may be combined and/or interchanged without departing from the scope of the invention.

The invention claimed is:

1. A battery housing for accommodating one or more battery modules in a housing interior comprising:
   a housing section having an exhaust duct integrated therein, wherein:
      the exhaust duct is configured to discharge media to the surroundings in an event of a defect of a battery module; and
      the exhaust duct comprises (1) an inlet region through which the media from the housing interior enter the exhaust duct, (2) a first deflection region that is configured to change a transport direction of the media, (3) a parallel region that adjoins the first deflection region in the transport direction of the media and runs inside the housing section parallel to a main plane thereof, (4) a second deflection region that adjoins the parallel region in the transport direction of the media and is configured to change the transport direction of the media a further time by deflecting the media at least 45°, and (5) an outlet region through which the media leaves the housing section and that forms a T-shape with the parallel region at the second deflection region so that one section of the parallel region forms a connection between the inlet region and the outlet region, and another section of the parallel region ends inside the housing section, wherein the another section of the parallel region that ends inside the housing section forms a collection device configured to trap particles of the media.

2. The battery housing of claim 1, wherein the first deflection region is configured to change the transport direction of the media by at least 45°.

3. The battery housing of claim 2, wherein the first deflection region is configured to change the transport direction of the media by about 90°.

4. The battery housing of claim 1, wherein the exhaust duct further comprises a hollow chamber that is at least partially reinforced by one or more struts.

5. The battery housing of claim 1, wherein the housing interior is sealed off from the surroundings during regular operation such that no gas and/or liquid exchange with the surroundings takes place and pressure equalization is provided by forced venting.

6. The battery housing of claim 1, wherein the housing interior is at least partially filled with a foam material.

7. The battery housing of claim 1, further comprising a safety valve, by which the exhaust duct communicates with the housing interior, wherein the safety valve is configured to close the exhaust duct during regular operation and to open the exhaust duct in case of occurrence of media in the event of the defect of the battery module.

8. The battery housing of claim 7, wherein the inlet region comprises the safety valve, and the safety valve is integrated in the housing section.

9. The battery housing of claim 7, wherein the safety valve is further configured to open the exhaust duct when a value of a pressure difference between the housing interior and the surroundings exceeds a threshold value.

10. The battery housing of claim 7, wherein the safety valve comprises or is formed as a rupture disc, which ruptures in an event of opening.

11. The battery housing of claim 10, wherein the rupture disc is formed by a thinning of a wall of the housing section in a region of the exhaust duct.

12. The battery housing of claim 1, wherein the housing section comprises an extrusion profile.

13. A battery system comprising:
   a battery housing configured to accommodate one or more battery modules in a housing interior, wherein the battery housing comprises a housing section having an exhaust duct integrated therein, the exhaust duct is configured to discharge media to the surroundings in an event of a defect of a battery module, and the exhaust duct comprises (1) an inlet region through which the media from the housing interior enter the exhaust duct, (2) a first deflection region that is configured to change a transport direction of the media, (3) a parallel region that adjoins the first deflection region in the transport direction of the media and runs inside the housing section parallel to a main plane thereof, (4) a second deflection region that adjoins the parallel region in the transport direction of the media and is configured to change the transport direction of the media a further time by deflecting the media at least 45°, and (5) an outlet region through which the media leaves the housing section and that forms a T-shape with the parallel region at the second deflection region so that one section of the parallel region forms a connection between the inlet region and the outlet region, and another section of the parallel region ends inside the housing section, wherein the another section of the parallel region that ends inside the housing section forms a collection device configured to trap particles of the media; and
   at least one battery module accommodated in the housing interior.

14. The battery system of claim 13, wherein the exhaust duct, at the inlet region, comprises an inner opening via which the exhaust duct communicates with the housing interior.

15. The battery system of claim 14, wherein the at least one battery module comprises a module-internal exhaust gas duct directly connected to the inner opening.

* * * * *